2,830,875
PROCESS FOR PRODUCTION OF AMMONIUM NITRATE

Robert A. Shurter, Jr., Terre Haute, Ind., assignor to Commercial Solvents Corporation, Terre Haute, Ind., a corporation of Maryland No Drawing. Application July 6, 1956
Serial No. 596,167

2 Claims. (Cl. 23—103)

My invention relates to a process for producing ammonium nitrate and more particularly it relates to an improved process for the production of ammonium nitrate by reacting ammonia with nitric acid, a portion of which is introduced to the reaction in the vapor phase.

U. S. Patent 2,568,901 issued to Leonard A. Stengel describes a process for production of ammonium nitrate whereby ammonia vapors are reacted with nitric acid at a temperature of from about 160° to 300° C. in a reaction zone which is filled with inert packing materials serving to increase the surface contact area and which is free to drain at its lower end so that the zone is maintained substantially free from liquid reaction products which are removed from the reaction zone as rapidly as possible in two phases, one of which is substantially steam and the other of which is molten ammonium nitrate, the moisture content of which is extremely low.

The ammonium nitrate reaction between nitric acid and ammonia is an exothermic reaction and if the reactants are introduced at room temperature the reaction temperature is generally of the order of about 140° C., depending upon the concentration of the nitric acid employed. Since, however, it is desirable to obtain an ammonium nitrate product containing as little moisture as possible, additional heat is customarily added to the reaction in order to raise the temperature sufficiently high to drive off substantially all of the moisture. As indicated in the above-mentioned U. S. Patent 2,568,901, the reaction is ordinarily conducted at a temperature of from about 160 to 300° C., the water content of the ammonium nitrate product depending upon the temperature attained within this range. In the process of the above-mentioned patent, the additional heat can be added to the reactor in a number of ways including preheating of the reactants, application of external heat to the reactor, etc. The most practical method of introducing additional heat to the reaction is, however, by preheating the reactants.

In carrying out the reaction for commercial production of ammonium nitrate according to the process described in U. S. Patent 2,568,901, nitric acid of a concentration of about 57% is customarily employed and using such concentration of nitric acid, the acid must be preheated to a temperature of about 200° C., in order to obtain an ammonium nitrate product having a moisture content less than about 1.0%. With lower concentrations of nitric acid, the required preheat to obtain such a product is higher but when employing higher concentrations of nitric acid, the required nitric acid preheat temperature is lower i. e. about 150° C. when nitric acid of a concentration of about 60% is employed.

It can be seen from the above that in carrying out the reaction of U. S. Patent 2,568,901, it is desirable to employ a nitric acid preheat temperature which is as high as possible in order to obtain a product having a moisture content as low as possible. However, when preheat temperatures above about 95° C. are employed, vaporization of the nitric acid takes place and excessive corrosion of ordinary steel or stainless steel equipment is experienced. Since nitric acid preheat temperatures below about 95° C. can only be employed using nitric acid of extremely high concentrations, it has been necessary to employ a tantalum preheater to avoid corrosion when the nitric acid is preheated to the temperature required to give a product of satisfactory moisture content when nitric acid of the customary concentration (about 57%) is employed. One possible means of preventing corrosion by nitric acid would be to preheat the nitric acid solution under pressure to prevent vaporization but it has been found that excessive pressures are necessary to prevent vaporization when nitric acid of a customary concentration is employed, i. e. a pressure of 115 p. s. i. gauge is required when 57% nitric acid is preheated to about 200° C.

A further difficulty in employing high nitric acid preheat temperatures in order to obtain a product of as low a moisture content as possible lies in the fact that there is a maximum nitric acid preheat temperature, as defined in U. S. Patent 2,723,183, which can be attained. Since, the lower the concentration of nitric acid which is employed, the higher the preheat temperature necessary to obtain a product of low moisture content, it can be seen that the maximum nitric acid preheat temperature limits the dilution of nitric acid which can be employed.

I have now discovered an improved process for producing ammonium nitrate by reacting nitric acid and ammonia in a reaction zone filled with inert packing materials serving to increase the surface contact area and which is free to drain at its lower end so that the zone is maintained substantially free from liquid reaction products which are removed as rapidly as possible in two phases, one of which is substantially steam and the other of which is molten ammonium nitrate. My new process makes it possible to employ much lower preheat temperatures for at least a portion of the nitric acid while still employing nitric acid of the customary concentration and while still obtaining a product of very low moisture content. The new process also permits the use of lower concentrations of nitric acid than could heretofore be employed due to the maximum allowable nitric acid preheat temperature. My new process is economical, efficient, and avoids the necessity of employing large pieces of tantalum equipment to avoid excessive corrosion.

My new process consists essentially of reacting ammonia vapors with nitric acid in a reaction zone filled with inert packing materials and which is free to drain at its lower end so that the zone is maintained substantially free from liquid reaction products and removing reaction products from the reaction zone as rapidly as possible in two phases, one of which is molten ammonium nitrate and introducing the nitric acid to the reactor in two streams, one of which is in the liquid state and the other of which is in the vapor state. By thus carrying out the process for production of ammonium nitrate to obtain substantially anhydrous molten ammonium nitrate, I am able to substantially reduce the required preheat temperature for the liquid stream of nitric acid introduced to the reactor. My new process thus permits the use of an ordinary stainless steel preheater for the liquid stream of nitric acid resulting in a substantial equipment saving. My new process also permits the use of lower concentrations of nitric acid while still obtaining a product of extremely low moisture content. Thus I am able to employ economically and satisfactorily aqueous nitric acid of a concentration as low as 40%, which could not previously be employed to obtain a product of low moisture content due to the fact that the preheat temperature required was far above the maximum allowable nitric acid preheat temperature disclosed and described in U. S. Patent 2,723,183.

In carrying out my process I can introduce the nitric acid vapor stream into the reaction chamber through the nitric acid inlet in the upper end of the reactor or through a separate inlet which can be placed adjacent to the ammonia inlet or in a position such that the vapor is introduced directly into the packing material contained in the reactor. I prefer to introduce the nitric acid vapors into the top of the reactor in the area adjacent to the nitric acid and ammonia inlet nozzles, using an individual inlet for the nitric acid vapor stream.

I can introduce up to about 60% of the nitric acid to the reactor in the vapor phase depending upon the concentration of the acid. I do not introduce a greater portion of the nitric acid as a vapor since to do so would require vaporizing equipment of such large size as to minimize or substantially eliminate the economic advantage obtained when less than about 60% of the nitric acid is introduced as a vapor due to low preheat temperature of the liquid nitric acid and the ability to use ordinary stainless steel equipment because of the low temperatures. As indicated, when nitric acid of a concentration of 40% is employed, 60% of the nitric acid is introduced to the reactor in the vapor phase. I prefer not to employ nitric acid of a concentration above about 65% since production of such acid is extremely expensive. Thus when employing nitric acid of this concentration, I need only introduce about 10% of the nitric acid as a vapor to the reactor in order to maintain the preheat temperature of the liquid stream below the limit at which ordinary stainless steel equipment can be employed, i. e. about 95° C. In my new process, I prefer to employ nitric acid of a concentration of 53% and to introduce about 32% of the nitric acid to the reactor as a vapor at a temperature of about 175° C. and about 68% of the nitric acid as a liquid at a temperature of about 65° C.

The following examples are offered to illustrate my invention; however, I do not intend to be limited to the specific procedures, proportions, or materials disclosed. Rather I intend to include within the scope of this invention all equivalents obvious to those skilled in the art.

*Example I*

A 53% aqueous solution of nitric acid, 32% as vapor at 177° C. and 68% as liquid at 66° C., was mixed at the rate of 456 lbs./hr. with 68.2 lbs./hr. of ammonia. The mixture was passed downwardly through a vertical stainless steel tube 7 feet long with an inside diameter of 1.85 in., the reactor being packed with one-quarter inch Berl saddles. Molten ammonium nitrate was collected as it flowed from the reactor tube at a rate of 291.4 lbs./hr. The ammonium nitrate product was found to have a moisture content of 0.929%.

*Example II*

Vapors of nitric acid at a concentration of 53% heated to 177° C. were introduced into a reactor such as that described in Example I at a rate of about 132.7 lbs./hr. A liquid solution composed of 73.8 lbs./hr. ammonium nitrate, 142.8 lbs./hr. nitric acid, and 127.2 lbs./hr. of water at 66° C. was also introduced into the reactor and mixed with ammonia amounting to 58.5 lbs./hr. Molten ammonium nitrate was collected as it flowed from the reactor tube at the rate of 327.3 lbs./hr. The ammonium nitrate product was found to have a moisture content of 0.913%.

*Example III*

A 41% aqueous solution of nitric acid, 59% as vapor at 177° C. and 41% as liquid at 66° C., was mixed at the rate of 73.7 lbs./hr. with 81.6 lbs./hr. of ammonia in a reactor such as described in Example I. Molten ammonium nitrate flowed from the reactor tube at a rate of 365 lbs./hr. The ammonium nitrate was found to have a moisture content of 0.976%.

*Example IV*

A 59% aqueous solution of nitric acid, 17% as vapor at 177° C. and 83% as liquid at 66° C., was mixed at the rate of 475 lbs./hr. with 75.7 lbs./hr. of ammonia in a reactor such as that described in Example I. Molten ammonium nitrate flowed from the reactor tube at a rate of 338 lbs./hr. The ammonium nitrate was found to have a moisture content of 0.897%.

Now having described my invention, what I claim is:

1. In a one-step process for producing molten ammonium nitrate containing regulated amounts of water by continuously reacting, at a temperature of about 160–300° C., ammonia vapors with aqueous nitric acid in a packed reaction zone free to drain at its lower end and removing the reaction products in two phases, one of which is steam and the other of which is molten ammonium nitrate, the improvement which comprises introducing from 60% to 10% of the aqueous nitric acid having a concentration ranging from 40 to 65% to the reaction zone in the form of preheated vaporous aqueous nitric acid with the remainder being in the form of preheated liquid aqueous nitric acid.

2. The process of claim 1 wherein about 32% of the nitric acid is introduced as aqueous nitric acid of a concentration of 53% in the vapor phase.

References Cited in the file of this patent

UNITED STATES PATENTS

| | | |
|---|---|---|
| 2,089,957 | Harris et al. | Aug. 17, 1937 |
| 2,568,901 | Stengel | Sept. 25, 1951 |
| 2,723,183 | Dorsey | Nov. 8, 1956 |